United States Patent Office 3,629,237
Patented Dec. 21, 1971

3,629,237
COMPOSITIONS USEFUL AS ENTERIC COATINGS AND METHOD FOR PREPARING ACID PHTHALATES OF CELLULOSE ETHERS FOR THEM
Shunichi Koyanagi, Kinya Ogawa, and Akira Yamamoto, Niigata-ken, Japan, assignors to Shinetsu Chemical Company, Chiyoda-ku, Tokyo, Japan
No Drawing. Filed Sept. 2, 1969, Ser. No. 854,789
Claims priority, application Japan, Sept. 12, 1968, 43/65,949, 43/65,950; Mar. 10, 1969, 44/18,152
Int. Cl. C08b *11/00*
U.S. Cl. 260—226
5 Claims

ABSTRACT OF THE DISCLOSURE

Acid phthalate of cellulose ethers represented by the general formula:

$$R^1_m R^2_n A$$

where $R^1$ is a hydroxyalkyl group of 3 or 4 carbon atoms, $R^2$, hydrogen or an alkyl group of 1 or 2 carbon atoms, $m$ and $n$ are positive integers, and A is residual cellulose structure which ethers are readily soluble in weak alkaline solution, besides possessing high solubility in organic solvents and excellent resistance to water; they are useful as enteric coatings, and drugs coated with them can stand long storage and are readily soluble upon passing into the intestines, thereby enhancing the effect of the drugs.

SUMMARY OF THE INVENTION

This invention relates to compositions useful as enteric coatings, containing as their main ingredient, acid phthalates of cellulose ethers; the invention also relates to a method for preparing the compositions.

Generally, qualities required of substances used as enteric coatings for various drugs are non-soluble in the human stomach, and ready solubility in human intestines, as well as non-toxicity and the capacity of readily providing coatings of capsules, tablets, and the like. The substances employed for such purposes are cellulose acetate acid phthalate (hereinafter abbreviated to CAP), methylcellulose acid phthalate (MCP), hydroxyethyl ethylcellulose acid phthalate (HEECP) and hydroxyethylcellulose acid phthalate (HECP).

However, CAP possesses poor water resistance, and during storage it is apt to be hydrolyzed by the moisture in the air, thereby setting free acetic acid whose odor remarkably reduces the commercial value of the tablets. Moreover, its solubility in weak alkaline solution when entering the human intestines is poor, making it difficult for the drug coated therewith to work effectively in the intestines, while MCP, HEECP and HECP have poor solubility in commonly-employed organic solvents such as acetone, so that their use as coatings is limited. Furthermore, drugs coated with HECP have the disadvantage of being liable to deterioration during storage, due to the poor water resistance of the coating agent.

It is an object of the invention to provide novel enteric coating compositions, free from the disadvantages mentioned above; another object of the invention is to provide novel enteric coating compositions which are readily soluble both in organic solvents and in weak alkaline solutions, facilitating not only the application of coatings to capsules, pills and the like, but also their dissolution in human intestines.

Still another object of the invention is to provide coating compositions, whose excellent water resistance will keep the drugs coated therewith free from the influence of the moisture contained in the air, so that the drugs will never lose their commercial value.

A further object of the invention is to provide a method for preparing acid phthalates for the above-given coating compositions, more particularly whiter acid phthalates of low polymerization degree, having higher commercial value.

The enteric coating compositions of the invention have, as their main ingredient, acid phthalates of cellulose ethers, said cellulose ethers represented by the general formula:

$$R^1_m R^2_n A$$

where $R^1$ is a hydroxyalkyl group of 3 or 4 carbon atoms, $R^2$ is hydrogen or an alkyl group of 1 or 2 carbon atoms, $m$ and $n$ are positive integers, and A, is residual cellulose structure.

Examples of such acid phthalates of cellulose ethers, employed as main ingredient, are acid phthalate of hydroxypropyl cellulose (HPCP), acid phthalate of hydroxybutyl methylcellulose (HBMCP), acid phthalate of hydroxypropyl methylcellulose (HPMCP), acid phthalate of hydroxybutyl cellulose (HBCP), and acid phthalate of hydroxypropyl ethylcellulose (HPECP).

The invention is based on the observation that phthalic acid esters of cellulose ethers have higher solubility in organic solvents than have MCP or HEECP, and that by varying the phthalyl content, they can be made to dissolve in solutions of optional pH values, so that the drugs coated with them easily dissolve when passing into the intestines, thereby increasing the effect of the drugs which has hitherto been considered difficult to utilize.

It has been observed that when $R^2$ of the above-given general formula is the methyl radical, that is, when the composition is an acid phthalate of hydroxyalkyl methylcellulose, the solubility of this cellulose ether in organic solvents increases with the increase of the hydroxyalkoxyl content and phthalyl content, and that in accordance with the degree of the phthalyl content, its solubility in liquids of various pH values changes. For example, acid phthalate of methylcellulose, which contains no hydroxyalkyl groups or of hydroxypropyl methylcellulose (HPMC) whose hydroxypropoxyl content is at most 2%, is insoluble in acetone, even if its phthalyl content is as high as 30 weight percent, while acid phthalate of HPMC having 5 weight percent of hydroxypropoxyl is soluble in acetone when its phthalyl content is 30 weight percent, and acid phthalate of HPMC having 11% of hydroxypropoxyl is soluble in acetone even at a phthalyl content of 25 weight percent. On the other hand, if the acid phthalates containing the same percent of hydroxypropoxyl increase in their phthalyl content, the lowest limit of the pH value of liquids in which they are soluble is raised. For example, acid phthalate of HPMC containing 8 weight percent of hydroxypropoxyl hardly dissolves in McIlvaine buffer solution of pH 5.0 if its phthalyl content is 33%, but a similar acid phthalate containing also 8% of hydroxypropoxyl but having a phthalyl content of 15.7% is readily soluble in the same buffer solution under similar conditions. Further, when HBMC is used as a raw material, acetone-soluble acid phthalate is obtained even when its hydroxybutoxyl content is lower than in the case of HPMC.

According to the present invention, acid phthalates having various weight percent of hydroxyalkoxyl content and various phthalyl contents can be optionally selected in accordance with the degree of solubility required of them in the organic solvents and/or the liquids of various pH values. But, in consideration of their processabilities as coating materials, which are represented by their ready dissolution in organic solvents, acid phthalates of hydroxyalkyl alkylcellulose, having at least 3 weight percent of hydroxyalkoxyl content and a phthalyl content of at least 15 weight percent, are preferably employed.

When $R^2$ is hydrogen, acid phthalates of HPC and HBC are soluble in various solvents such as acetone, acetone-methanol, and methylene chloride-methanol, unlike the known acid phthalates of hydroxyethyl cellulose, mentioned before, for which the kinds of solvents to be used are limited. Furthermore, they are superior to HECP in water resistance, especially in the prevention of moisture permeability. Their hydroxyalkoxyl content should be at least 10%, so that they may be dissolved easily in organic solvents and their phthalyl content, at least 15 weight percent, in view of their solubility in organic solvents and in the liquids of desired pH values.

Acid phthalates of cellulose ethers of the invention are obtained by reacting cellulose ether and phthalic anhydride in the presence of a catalyst of anhydrous alkali metal salt of acetic acid, such as sodium acetate and potassium acetate, in an organic acid medium. The amount of phthalic anhydride employed depends upon the quality of the product desired and the raw materials used but generally speaking, it may be from 30 to 200 weight parts per 100 weight parts of cellulose ether. The amount of the organic acid used as medium may be from 100 to 500 weight parts per 100 weight parts of cellulose ether, and that of anhydrous alkali metal salt of acetic acid, from 5 to 40 weight parts per 100 weight parts of organic acid, though also depending upon the viscosity of cellulose ether used and the agitation power. The reaction is carried out in the temperature range of from 40 to 100° C., but preferably in the range of from 60 to 100° C. in the initial stage of the reaction, and subsequently in the range of from 40 to 80° C. The reaction time is from 4 to 20 hours, though depending upon the other reaction conditions. It is generally preferred to use, as coating agents, acid phthalate of cellulose ethers of low viscosity, and to meet this requirement, cellulose ethers of low viscosity are employed as the starting material to be reacted. When the starting material is of high viscosity, its viscosity is reduced by some known method before the material is esterified, or the material of high viscosity is first esterified and then the viscosity of the esterified compound is reduced. These methods are, however, very complicated, and it is not economical to practice them. Particularly when the starting material is first phthalated and then hydrolyzed, esters themselves are likely to be hydrolyzed and dephthalated, making it difficult to obtain the desired esters of low molecular weight.

We made further studies on this point and found that in reacting phthalic anhydride with cellulose ether in the medium of some organic acid such as acetic acid, propionic acid, and butyric acid, and in the presence of a catalyst such as anhydrous sodium acetate and potassium acetate, an addition of at least one kind of alkali metal salt of oxyacids of halogens, such as potassium chlorate, potassium bromate, and sodium chlorate, will make it easier for low-viscosity acid phthalates of cellulose ethers to be prepared, and that the products thus prepared are made whiter by the bleaching action of these metal salts. The reaction temperature in this case depends on the phthalyl content desired in the finished products, but generally it is in the range of from 40 to 100° C. The amount of the metal salt of the oxyacid of halogen to be employed varies in accordance with the polymerization degree of the raw material and that desired of the finished product, but generally it is from 1 to 20 weight percent calculated on the weight of the cellulose ether. If the amount is very large, it is apt to react too violently, so that it should be added in small portions.

Acid phthalates of cellulose ethers of the invention are generally obtained in solution of high concentrations, of from 10 to 20%, in some organic solvent, but their viscosities are comparatively low, so that the coating operation with them may be conducted by any methods generally practiced, such as the Wurster method, the Cap method and the Spray method. Most preferable is the Pan-Spray method.

The organic solvents may be selected from the group consisting of methyl alcohol, ethyl alcohol, isopropyl alcohol, methyl cellosolve, ethyl cellosolve, dioxane ether, acetone, methylethyl ketone, diacetylene alcohol, benzene, toluene, methyl lactate, methyl acetate, ethyl acetate, methylene chloride, trichloroethylene, methyl chloroform, chloroform and ethylene chloride, and they may be employed either alone or in mixture of two or more.

When coating drugs or capsules with these acid phthalates of cellulose ethers, for the purpose of improving the strength, extensibility, gloss, moisture resistance, and appearance of coating films given by them, as well as their processability, plasticizers may be added such as diethyl phthalate, dibutyl phthalate, dimethyl phthalate, triacetin, monoacetin, diacetin, diethylene glycol, dibutyl tartrate, ethyl phthalyl, ethyl glycollate, hydroxypropyl glycerine and triphenyl phosphate, and various additives, e.g., sugars; higher fatty acids, such as stearic acid, abietic acid and oleic acid and esters thereof; higher alcohols such as cetyl alcohol, and lauryl alcohol; paraffins and amines such as hexadecyl amine and the like; various surfactants, natural high polymers, such as zein, shellac, balsam, casein, starch, rosin derivatives, and tragacanth gum; synthetic high polymers, such as silicone, polyvinyl pyrolidone, polyvinyl alcohol, polyvinyl acetate, polyacrylic acid, polyacrylic ester, polymethacrylic ester, polyethylene, polyethylene glycol, ethylene oxide-propylene oxide copolymer, and polypropylene glycol; cellulose derivatives such as methyl cellulose, hydroxyethyl cellulose, hydroxypropyl cellulose, hydroxypropyl methyl cellulose, carboxymethyl cellulose, ethyl cellulose, cellulose nitrate, celluose acetate, cellulose acetate phthalate and cellulose acetate butyrate; and inorganic substances such as alumina, silica, calcium carbonate, kaolin, talc, calcium phosphate, boric acid and sodium chloride; and if necessary, known coloring agents, deodorizing agents, and deflavoring agents. These additives may be added to the above-given acid phthalate of cellulose ether, which is the main ingredient of the composition of the present invention, and subsequently the mixture may be employed for the coating of drugs, or either the main ingredient or the additives may be applied to the drugs first, and then the second coating may be applied with the remaining component.

The details of the present invention shall be further described in the following examples, in which parts and percentages are all given by weight. Tests were made with artificial gastric fluid and artificial intestinal fluids which were prepared as follows:

(1) ARTIFICIAL GASTRIC FLUID

To 2 g. of sodium chloride, 3.2 g. of pepsin and 24 cc. of 10% HCl was added distilled water in such an amount that the volume of the finished product will be 1 l. The mixture thus prepared had a pH value of 1.2.

(2) ARTIFICIAL INTESTINAL FLUID

To 15 g, of sodium bicarbonate and 28 g. of pancreatin was added distilled water in such an amount that the volume of the finished product will be 1 l. The mixture thus prepared had a pH value of 8.3.

EXAMPLE 1

100 parts of glacial acetic acid, 25 parts of anhydrous sodium acetate, 60 parts of phthalic anhydride and 50 parts of one of the cellulose ethers given in Table 1 (viscosity of 2% aqueous solution at 25° C.: 15 cps.), were charged into a reactor equipped with a stirrer, and reacted for 5 hours at the temperature of 80° C. To the reaction product was added 800 parts of water, and the precipitate was filtered, washed with water and dried for 5 hours at 60° C., whereby acid phthalate of the cellulose ether employed as the raw material is obtained. In carrying out Experiments 1–12 and 1–13, the amount of phthalic anhydride added was reduced to 45 parts in order to lower the phthalyl content, with other conditions remaining the same.

Films prepared of methanol-methylene chloride (1:1) solutions of the products obtained in Experiments 1–1∼ 1–13 and a commercial CAP (1–14) were each processed into a film of 10 x 10 x 0.08 mm., in order to test the solubility thereof. The results are given in Table 1. They were all insoluble in artificial gastric fluid.

The products obtained were soluble in acetone and artificial intestinal fluid but insoluble in artificial gastric fluid.

EXAMPLE 3

Experiments given in Example 2 were repeated under the same conditions except that 50 parts of hydroxybutyl methylcellulose (hydroxybutoxyl content: 12%; methoxyl content: 10%, viscosity of 2% aqueous solution at 25° C.: 60 cps.) and 5 parts of sodium chlorate were employed.

TABLE 1.—SOLUBILITY (DISSOLVING TEMPERATURE: 37° C.)

| | Raw material | | | Product (acid phthalate of raw material) | | Solubility in— | | |
|---|---|---|---|---|---|---|---|---|
| Experiment number | Kind | $HOR^1O-$ (percent) | $R^2O-$ (percent) | Kind | Phthalyl content (percent) | Acetone (secondary) | Methylene chloride-methanol (1:1) (minimum) | Artificial intestinal fluid (minimum) |
| 1–1 | MC | 0 | 28 | MCP | 30.0 | Swelled | 130 | 25 |
| 1–2 | HPMC | 2 | 28 | HPMCP | 30.3 | 340 | 90 | 25 |
| 1–3 | HPMC | 5 | 28 | HPMCP | 34.2 | 52 | 32 | 10 |
| 1–4 | HPMC | 8 | 28 | HPMCP | 35.4 | 52 | 30 | 10 |
| 1–5 | HPMC | 11 | 28 | HPMCP | 36.2 | 50 | 28 | 10 |
| 1–6 | HBMC | 3 | 27 | HBMCP | 30.0 | 62 | 18 | 22 |
| 1–7 | HPC | 9 | 0 | HPCP | 28.2 | Swelled | 89 | 29 |
| 1–8 | HPC | 50 | 0 | HPCP | 42.0 | 24 | 28 | 13 |
| 1–9 | HBC | 46 | 0 | HBCP | 38.4 | 63 | 43 | 16 |
| 1–10 | HPEC | 8 | 20 | HPECP | 33.2 | 43 | 32 | 11 |
| 1–11 | HEC | 35 | 0 | HECP | 39.7 | 82 | 43 | 13 |
| 1–12 | HPMC | 8 | 28 | HPMCP | 26.4 | 56 | 34 | 10 |
| 1–13 | HPMC | 5 | 28 | HPMCP | 24.3 | Swelled | 33 | 12 |
| 1–14 | | | | CAP | 36.0 | 40 | 20 | 14 |

NOTE:
MC=Methyl cellulose.
HPMC=Hydroxypropyl methyl cellulose.
HBMC=Hydroxybutyl methyl cellulose.
HPC=Hydroxy propyl cellulose.
HBC=Hydroxy butyl cellulose.
HPEC=Hydroxy propyl ethyl cellulose.
HEC=Hydroxyethyl cellulose.

Similarly, another 0.1 mm. thick film was prepared of each of the solutions and under the conditions of 100% relative humidity at 30° C.; the transmission velocity of vapor into the condition of relative humidity of 5%, was measured by the increase in weight of calcium chloride due to moisture absorption. The results are given in Table 2.

TABLE 2.—TRANSMISSION VELOCITY

| | | Quantity transmitted (gr./cm.²) | | Transmission velocity (mg./cm.² hr.) | |
|---|---|---|---|---|---|
| Kind | | 1 day | 5 days | 1 day | 5 days |
| 1–5 | HPMCP | 0.0081 | 0.0395 | 0.337 | 0.329 |
| 1–8 | HPCP | 0.0022 | 0.0106 | 0.092 | 0.088 |
| 1–11 | HECP | 0.0208 | 0.0980 | 0.867 | 0.817 |
| 1–14 | CAP | 0.0181 | 0.0832 | 0.754 | 0.693 |

EXAMPLE 2

50 parts of hydroxypropyl methyl cellulose (viscosity of 2% aqueous solution at 25° C.: 60 cps., hydroxypropoxyl content: 12%, methoxyl content: 28%), 60 parts of phthalic anhydride, 50 parts of anhydrous sodium acetate, 200 parts of glacial acetic acid and potassium chlorate in the ratio given in Table 3, were charged in a reactor equipped with a stirrer, and reacted for 5 hours at 80° C. To the reaction solution were added, 800 parts of distilled water while stirring, and the precipitate was filtered, washed with 1000 parts of distilled water, and dried for 5 hours at 60° C., yielding pure white hydroxypropylmethyl cellulose phthalate. The phthalyl content of the products thus prepared were in the range of from 35 to 37%, and 15% acetone solutions of the products proved to have the viscosities given in Table 3.

TABLE 3

| | $KClO_3$ parts | Viscosity,[1] cps. |
|---|---|---|
| 2–1 | 0 | 2,500 |
| 2–2 | 0.5 | 1,000 |
| 2–3 | 2.5 | 300 |
| 2–4 | 5.0 | 70 |
| 2–5 | 10.0 | 10 |

[1] 15% acetone solution of the product at 25° C.

When the phthalation was carried out, hydroxybutyl methylcellulose phthalate was obtained which was white in color and had a phthalyl content of 35%. The viscosities of 15% acetone solutions of these products were each 100 cps. at 25° C. The products were insoluble in artificial gastric fluid, but soluble in artificial intestinal fluid.

EXAMPLE 4

50 parts of hydroxypropyl cellulose (hydroxypropoxyl content: 50%, viscosity of 2% aqueous solution at 25° C.: 100 cps.), 5 parts of potassium bromate, 60 parts of phthalic anhydride, 30 parts of anhydrous potassium acetate and 300 parts of propionic acid were charged into a reactor equipped with a stirrer and were reacted at 85° C. for 2 hours, and then the temperature was lowered to 60° C. and the reaction was continued for 3 more hours. 1000 parts of water were added to the reaction product and the precipitate obtained was filtered, washed with water, and dried at 60° C. for 5 hours yielding white acid phthalate with a phthalyl content of 43%. The viscosity of a 15% acetone solution of the product proved to be 120 cps. at 25° C. The product was soluble in acetone and artificial intestinal fluid, but insoluble in artificial gastric fluid.

EXAMPLE 5

50 parts of hydroxypropyl methylcellulose hydroxypropoxyl content: 11%, methoxyl content: 28%, viscosity of 2% aqueous solution at 25° C.: 60 cps.), 50 parts of anhydrous sodium acetate, 200 parts of glacial acetic acid and 5 parts of potassium chlorate were charged, together with phthalic anhydride in the ratio given in Table 4, into a reactor equipped with a stirrer and were reacted at 80° C. for 5 hours. To the reaction product 800 parts of distilled water were added, and the precipitate obtained was filtered, washed with water and dried at 60° C. for 5 hours, yielding acid phthalate (HPMCP) having a variety of phthalyl contents as given in Table 4.

These products were each dissolved in a mixture of methanol and methylene chloride (1:1), and a 0.05 mm. thick film was formed of each solution. The solubility test conducted on these films, employing McIlvaine buffer solution, gave the results shown in Table 4.

TABLE 4

| Experiment No. | Kind | Quantity of phthalic anhydride added | Phthalyl content | Dissolution velocity of products (minimum) | | | |
|---|---|---|---|---|---|---|---|
| | | | | pH 5.0 | pH 5.4 | pH 6.0 | pH 6.4 |
| 5-1 | HPMCP | 60 | 36.1 | | 184 | 15 | 10 |
| 5-2 | HPMCP | 55 | 33.9 | | 60 | 11 | 6 |
| 5-3 | HPMCP | 45 | 23.9 | 97 | 17 | 10 | 3 |
| 5-4 | HPMCP | 35 | 15.7 | 9 | 5 | 3 | 2 |
| 5-5 | CAP | | 36.0 | | | 28 | 16 |

The decomposition velocities of HPMCP (5-2) and commercial CAP (5-5) each measured by the quantity of free acid generated under the atmosphere of saturated steam at 60° C. were as shown in Table 5.

TABLE 5

| | Quantity of free acid (calculated as phthalic acid) generated (percent) | |
|---|---|---|
| Days elapsed | HPMCP | CAP |
| 5 | 2.5 | 10 |
| 10 | 3.0 | 13 |
| 15 | 3.2 | 14 |
| 20 | 3.2 | 14.5 |
| 25 | 3.3 | 14.7 |
| 30 | 3.3 | 14.9 |

EXAMPLE 6

HPMCP obtained in Example 5 was employed in the coating test in which a Pan-Spray method was employed, as explained below. The composition of the coating liquid used was as given in Table 6.

1.7 kg. of uncoated tablets (10 mm. in diameter and 200 mg. in weight) were put in a coating pan (310 mm. in diameter and 36 r.p.m.), and coating was conducted by employing a spray gun, whose nozzle size was 2.5 mm. in diameter. The liquid temperature was kept at 50° C.; the drying temperature was 55° C.; air pressure=5 kg./cm.². A cycle of 10 seconds of spraying and 15 seconds of drying was repeated for 5 hours. The quantity of the liquid employed was 2.8 kg., and the coated tablets weighed 1.86 kg. The quantity of the composition coated on the tablet was 20 mg., and the coating efficiency was 57%. During the coating process, no trouble of the tablets adhering to each other or to the wall of the coating pan was observed. The tablets were insoluble in artificial gastric fluid, but were decomposed in 192 seconds in artificial intestinal fluid.

TABLE 6

Composition of the coating agent

| | Parts |
|---|---|
| HPMCP (Experiment 5-1) | 8.5 |
| Acetyl monoglyceride | 1.5 |
| Airosil | 0.5 |
| Titanium white | 0.5 |
| Acetone | 30.0 |
| Ethyl Cellosolve | 60.0 |

What is claimed is:

1. Compound useful as an enteric coating consisting essentially of an acid phthalate of a cellulose ether having the general formula:

$$R^1_m R^2_n A$$

where $R^1$ is a hydroxyalkyl group of 3 to 4 carbons, $R^2$ is selected from the group consisting of hydrogen and alkyl groups of 1 to 2 carbons, $m$ and $n$ are positive integers, and A is residual cellulose structure and wherein the phthalyl content is at least 15% by weight and the hydroxyalkoxyl content is at least 3% by weight.

2. The compound of claim 1 wherein $R^2$ is hydrogen.

3. The compound of claim 2 wherein the hydroxyalkoxyl content is at least 10% by weight.

4. Method for preparing a compound useful as an enteric coating consisting essentially of an acid phthalate of a cellulose ether having the general formula:

$$R^1_m R^2_n A$$

where $R^1$ is a hydroxyalkyl group of 3 to 4 carbons, $R^2$ is selected from the group consisting of hydrogen and alkyl groups of 1 to 2 carbons, $m$ and $n$ are positive integers, and A is residual cellulose structure, which method comprises reacting 100 parts by weight of said cellulose ether with 30 to 200 parts by weight of phthalic anhydride for 4 to 20 hours at 40° to 100° C. in a medium of from 100 to 500 parts by weight of an organic acid selected from the group consisting of acetic acid, propionic acid and butyric acid and in the presence of an anhydrous alkali metal salt of acetic acid in an amount of from 5 to 40 parts by weight per 100 parts by weight of said organic acid, thereby producing an acid phthalate of a cellulose ether having a phthalyl content of at least 15% by weight and a hydroxyalkoxyl content of at least 3% by weight.

5. The method of claim 4 in which the reaction is carried out in the presence of at least one alkali metal salt of an oxyacid of halogen selected from the group consisting of potassium chlorate, potassium bromate and sodium chlorate in an amount from 1% to 20% by weight of said cellulose ether.

References Cited

UNITED STATES PATENTS

| 1,994,038 | 3/1935 | Hagedorn et al. | 260—226 |
| 2,196,768 | 4/1940 | Hiatt | 260—224 |
| 2,718,667 | 9/1955 | Malm et al. | 260—226 |
| 2,852,508 | 9/1958 | Hiatt et al. | 260—226 |
| 2,856,399 | 10/1958 | Mench et al. | 260—224 |
| 3,435,027 | 3/1969 | Desmarais et al. | 260—226 |

DONALD E. CZAJA, Primary Examiner

R. W. GRIFFIN, Assistant Examiner

U.S. Cl. X.R.

106—187, 189, 190, 197 R; 117—166; 260—13, 17 R, 224; 424—362